United States Patent
Cochran et al.

(10) Patent No.: US 8,732,508 B2
(45) Date of Patent: May 20, 2014

(54) DETERMINING POWER TOPOLOGY OF A PLURALITY OF COMPUTER SYSTEMS

(75) Inventors: Charles W. Cochran, Spring, TX (US); Chris F. Felcman, Spring, TX (US); Scott E. Holloway, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 281 days.

(21) Appl. No.: 13/254,144

(22) PCT Filed: Mar. 31, 2009

(86) PCT No.: PCT/US2009/039041
§ 371 (c)(1),
(2), (4) Date: Aug. 31, 2011

(87) PCT Pub. No.: WO2010/114531
PCT Pub. Date: Oct. 7, 2010

(65) Prior Publication Data
US 2011/0320849 A1    Dec. 29, 2011

(51) Int. Cl.
*G06F 11/30* (2006.01)
*H02B 1/22* (2006.01)

(52) U.S. Cl.
USPC .............. 713/340; 713/300; 307/72; 307/112

(58) Field of Classification Search
USPC ............................ 713/300, 340; 307/72, 112
See application file for complete search history.

(56) References Cited

U.S. PATENT DOCUMENTS

| | | | |
|---|---|---|---|
| 6,855,881 B2 | 2/2005 | Khoshnood | |
| 7,010,441 B2 | 3/2006 | Galli et al. | |
| 7,490,996 B2 | 2/2009 | Sommer | |
| 2004/0000815 A1 | 1/2004 | Pereira | |
| 2004/0230390 A1 | 11/2004 | Galli | |
| 2005/0012396 A1 | 1/2005 | Chidambaram et al. | |
| 2005/0212504 A1 | 9/2005 | Revital et al. | |
| 2007/0150215 A1* | 6/2007 | Spitaels et al. | 702/61 |
| 2009/0011639 A1 | 1/2009 | Ballard | |
| 2009/0125158 A1* | 5/2009 | Schweitzer et al. | 700/293 |

(Continued)

FOREIGN PATENT DOCUMENTS

| | | |
|---|---|---|
| CN | 1705297 (A) | 12/2005 |
| CN | 1717657 (A) | 1/2006 |
| CN | 101084615 (A) | 12/2007 |
| WO | 2010114531 | 10/2010 |

OTHER PUBLICATIONS

Raritan, "Raritan Introduces First Intelligent Power Distribution Unit to give IT and Facility Managers Detailed Power Information to Improve Data Center Operation," Apr. 7, 2008, 3 p.

(Continued)

*Primary Examiner* — Vincent Tran (57) ABSTRACT

Determining power topology of a computer system. At least some of the illustrative embodiments are methods including communicating with a first computer system of a plurality of computer systems mounted in a rack (the communicating through dedicated communication conductors integral with a first cord carrying operational power to first computer system), communicating with a second computer system of the plurality of computer systems (the communicating through dedicated communication conductors integral with a second cord carrying operational power to first computer system), determining a power topology regarding the plurality of computer systems based on the communicating, and displaying an indication of the power topology.

13 Claims, 6 Drawing Sheets

(56) References Cited

U.S. PATENT DOCUMENTS

| | | | |
|---|---|---|---|
| 2009/0217073 A1* | 8/2009 | Brech et al. | 713/340 |
| 2009/0222682 A1* | 9/2009 | Piper et al. | 713/340 |
| 2009/0322160 A1* | 12/2009 | Dubose et al. | 307/131 |
| 2010/0005331 A1* | 1/2010 | Somasundaram et al. | 713/340 |
| 2010/0084921 A1* | 4/2010 | Martins | 307/72 |
| 2010/0211810 A1* | 8/2010 | Zacho | 713/324 |
| 2010/0237852 A1* | 9/2010 | Tazzari et al. | 324/86 |
| 2011/0022245 A1* | 1/2011 | Goodrum et al. | 700/297 |
| 2012/0117392 A1* | 5/2012 | Turicchi et al. | 713/300 |

OTHER PUBLICATIONS

Server Technology, Inc., "Sentry: POPS Switched CDU," Copyright Server Technology, Inc., Q408 Version Nov. 2008, 8 p.

Hewlett-Packard Development Company, L.P., PCT Search Report, WO/2010/114531, published Oct. 7, 2010 3 p.

* cited by examiner

DETERMINING POWER TOPOLOGY OF A PLURALITY OF COMPUTER SYSTEMS

CROSS-REFERENCE TO RELATED APPLICATION

The present application claims priority to PCT/US2009/039041, filed 31 Mar. 2009, hereby incorporated herein by reference.

BACKGROUND

Rack-mounted computer systems offer high computer density for situations utilizing multiple computer systems. In some cases, each rack-mounted computer system has one or more switching power supplies to convert alternating current (AC) power to direct current (DC) power for use. In other cases, the rack mounted computer systems may be "blade servers," where each blade server selectively plugs into a rack-mounted enclosure, and the blade servers within the enclosure are provide DC power from switching power supplies associated with the enclosure as a whole, rather than with particular blade servers.

Regardless of whether computer systems are rack mounted themselves, or blade servers within a rack-mounted enclosure, for high reliability each rack-mounted computer system and/or enclosure for blade servers may have redundant power supplies couple to different sources of AC power. In the event one source of power fails (e.g., a circuit breaker trips), the computer systems may still remain operational based on the alternate source of power. However, ensuring that redundant power supplies are indeed coupled to intended sources of power is sometimes difficult, particularly given the number of power cables and data cables populating the back of a rack comprising plurality of rack-mounted computer system. In many cases, a power cable routing error may not be discovered until loss of an AC source results in catastrophic failure.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, through an indirect connection via other devices and connections.

"Power topology" shall mean: data indicative of through which intermediate devices (e.g., circuit breaker, power distribution unit, extension bar) a power supply of a computer system draws operational power into the power supply; a value indicative of the computer system in which the power supply resides; and/or data indicative of the operational power drawn itself (e.g., electrical current drawn, voltage, phase of a power source from which power is drawn).

"Operational power" shall mean power to operate, in whole or in part, a computer system. Although some electronic data communications have a net power flow from the transmitting to the receiving device, such power flow appurtenant to data communications shall not be considered operational power for purposes of this disclosure and claims.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of determining power topologies for rack-mounted computer systems, such as rack-mounted servers and rack-mounted blade enclosures having a plurality of blade servers therein, and where the rack-mounted computer systems may be operated as server farm or data center. The description that follows is based on the developmental context. However, the determination of power topologies as described herein is not limited to rack-mounted computer systems operating as servers or a data center, and finds application in other high density computer systems, such as telecommunication router systems and data communication switching centers. Thus, the developmental context shall not be construed as a limitation as to the applicability of the various embodiments.

Figure 1:
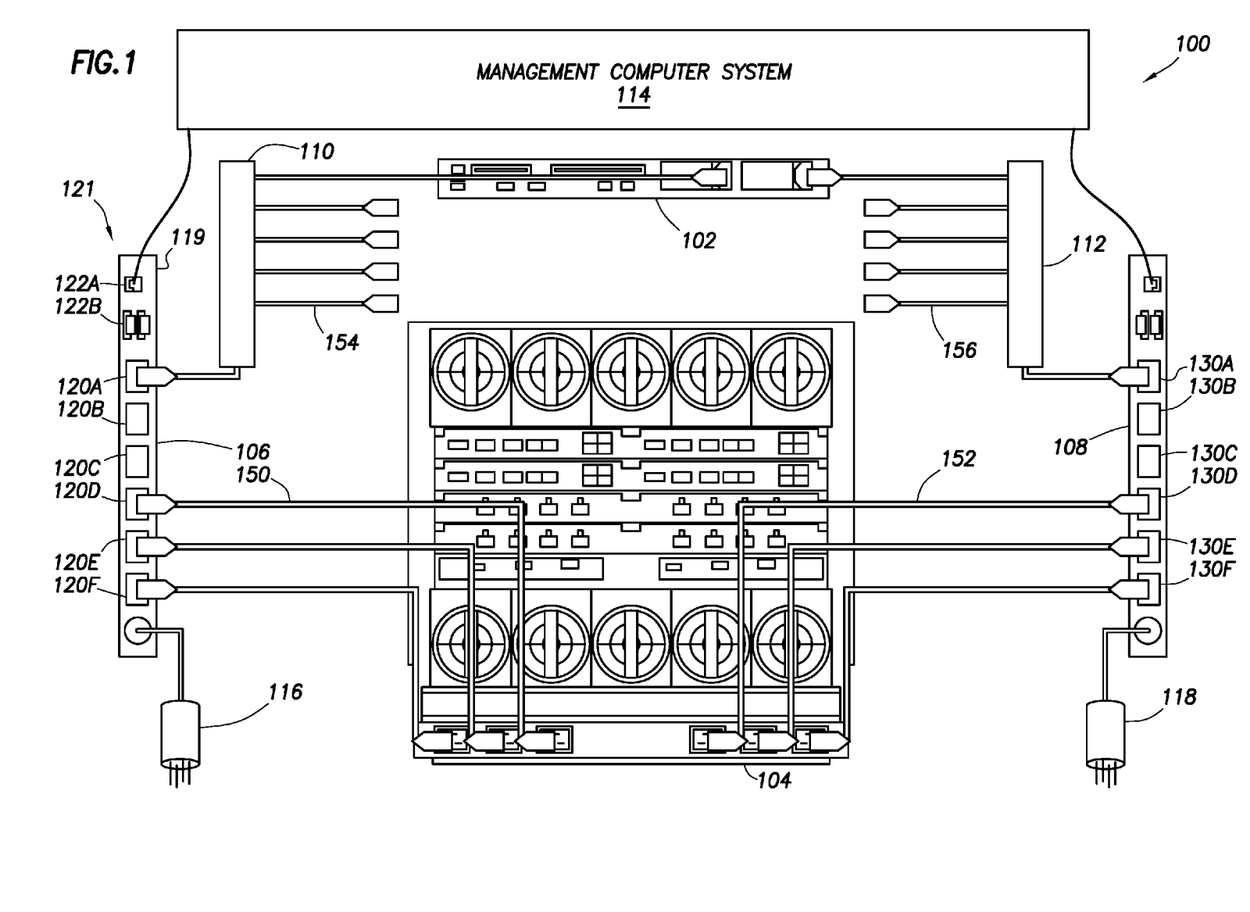
FIG. 1 shows a system in accordance with at least some embodiments.

FIG. 1 shows a system 100 in accordance with at least some embodiments. In particular, FIG. 1 illustrates the back of a rack mounted computer system 102, the back of a rack-mounted blade enclosure 104 (hereafter just "blade enclosure" 104), two power distribution units 106 and 108, two extension bars 110 and 112, and a management computer system 114. Each of the power distribution units 106 and 108 couple to a source of alternating current (AC) power, as illustrated by the connectors 116 and 118. In some embodiments, each source of AC power is a single phase source of AC power, and in other embodiments each source is three-phase source of AC power. In most cases, the power that flows to the power distribution unit 106 through connector 116 flows through a different circuit breaker than power that flows to the power distribution unit 108 through connector 118, such that if one circuit breaker trips, computer systems configured to draw power from either power distribution unit 106, 108 can continue to operate in spite of the loss of power to one power distribution unit.

Each power distribution unit defines an enclosure with an external surface, and a plurality of connectors accessible on the external surface. Referring to power distribution unit 106 as illustrative of both power distribution units 106 and 108, the power distribution unit 106 has an enclosure 119, and a plurality of power connectors 120 accessible on the outer surface 121 of the enclosure 119. Each connector 120 defines power conductors configured to carry operational power for coupled computer systems, and thus the power conductors of each power connector are coupled to the respective source of AC power for that power distribution unit. The illustrative power distribution unit 106 also defines a plurality of data connectors 122 accessible on the outer surface 121. Data connectors are distinguishable from power connectors not only based on the physical connector type, but also in that the data connectors do not have conductors configured to carry AC operational power to a computer system.

In accordance with the various embodiments, computer systems couple to the electrical connectors 120, 130 of a power distribution unit 106, 108, and the computer systems draw operational power through the coupled power connectors 120, 130. For example, rack-mounted computer system 102 couples to power connector 120A of power distribution unit 106 (through extension bar 110, discussed more below). Likewise, rack-mounted computer system 102 couples to power connector 130A of the power distribution unit 108 (through extension bar 112, also discussed more below). The rack-mounted computer system 102 is configured to draw operational power through power distribution unit 106, power distribution unit 108, or both. Similarly, the blade enclosure 104 couples to power connectors 120 of power distribution unit 106. Because blade enclosure 104 may support a plurality of blade servers, blade enclosure 104 may coupled to a plurality of power connectors of power distribution unit 106, and as illustrated electrical connector 120D-F of power distribution unit 106. Likewise, blade enclosure 104 couples to power connectors 130D-F of the power distribution unit 108. The blade enclosure 104 is configured to draw operational power through power distribution unit 106, power distribution unit 108, or both. It is noted that the extension bars 110, 112 are not required, and in embodiments where the extension bars 110, 112 are omitted, the computer system 102 may couple directly to the power distribution bars 106, 108.

In accordance with the various embodiments, the cords (e.g., cords 150, 152, 154 and 156) that couple between a power distribution units 106, 108 and the computer systems 102 and/or blade enclosure 104 have not only power conductors that carry operational power, but also have communications or data conductors that carry data, the data conductors integrally formed with each cord. Moreover, and as discussed more fully below, the switching power supplies in the rack-mounted computer system 102 and the switching power supplies in the blade enclosure 104 are configured to pass the data communications carried on the data conductors to processors of their respective systems. Thus, data communications may take place between power distribution units 106 and 108 and the computer systems 102 and 104 to gather power topology data, and the power distribution units 106 and 108 may also communicate the power topology data to the management computer system 114. The specification now turns to the illustrative embodiments of the cords and connectors.

Figure 2:
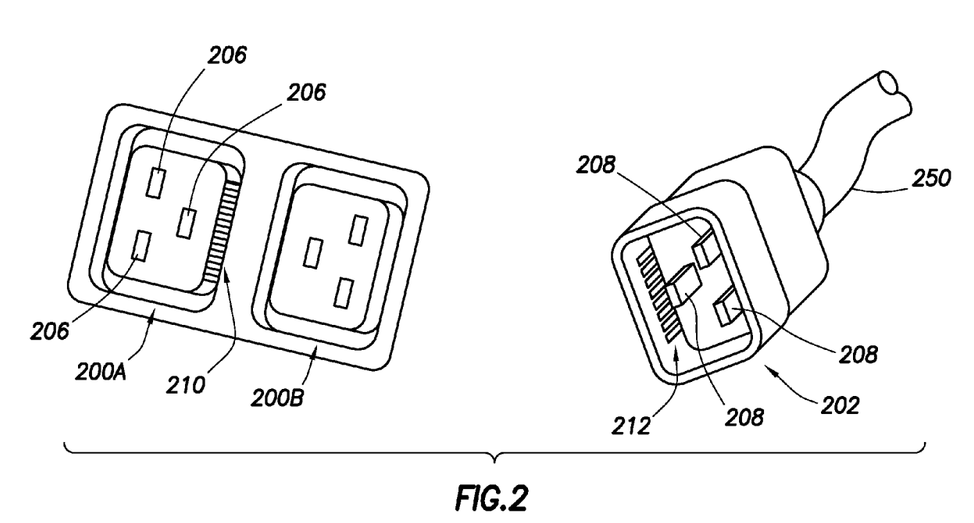
FIG. 2 shows a connector and cord end in accordance with at least some embodiments.

FIG. 2 illustrates a perspective view of a set of power connectors 200 (which may correspond to connectors 120, 130), and a corresponding cord end 202, in accordance with at least some embodiments. In particular, each power connector 200 defines a plurality of apertures 206 within which conductive material is exposed, and the conductive material is coupled to the source of AC power and thus define conductors configured to carry operational power. In some situations, one conductor is designated as a supply or "hot" conductor, one conductor is designated as the neutral or return, and the third conductor designated as the safety ground. Relatedly, the cord end 204 defines a plurality of blades 208 configured to fit within respective apertures 206 when the cord end 202 is plugged into one of the electrical connectors 200. The blades 208 electrically couple to conductors in the cord 250. In some embodiments, each power connector 200 and cord end 202 is based on International Electrotechnical Commission (IEC) chassis sockets and line plugs, such as IEC C20 and C19 respectively; however, other shapes and forms (e.g., IEC C13 line plug and C14 chassis sockets) may be equivalently used.

Still referring to FIG. 2, in addition to the power conductors to carry operational power, a power connector 200 in accordance with at least some embodiments also comprises a plurality of data conductors 210. Likewise, the cord end 202 comprises a corresponding plurality of data conductors 212, and at least some of the data conductors 212 couple to conductors in the cord 250. The data conductors 210 are disposed on the power connector 200 in such a way that when the cord end 202 mates with a power connector 200, the data conductors 212 on the cord end 202 electrically couple to the data conductors 210. In accordance with at least some embodiments, the power connectors 200 comprise eight data conductors; however, any number of data conductors may be equivalently used. Moreover, though termed "data conductor," the name shall not be read to require that each conductor carry data. For example, two of the eight conductors may be ground conductors. Other conductors may used in a Boolean sense. For example, two data conductors on the cord end 202 may be shorted together within the cord end 202 and used as presence detect. That is, when a cord end 202 is plugged into an electrical connector 200, the shorted data conductors on the cord end 202 provide a Boolean indication to circuits within the power distribution unit that the cord is plugged into the particular power connector.

Figure 3:
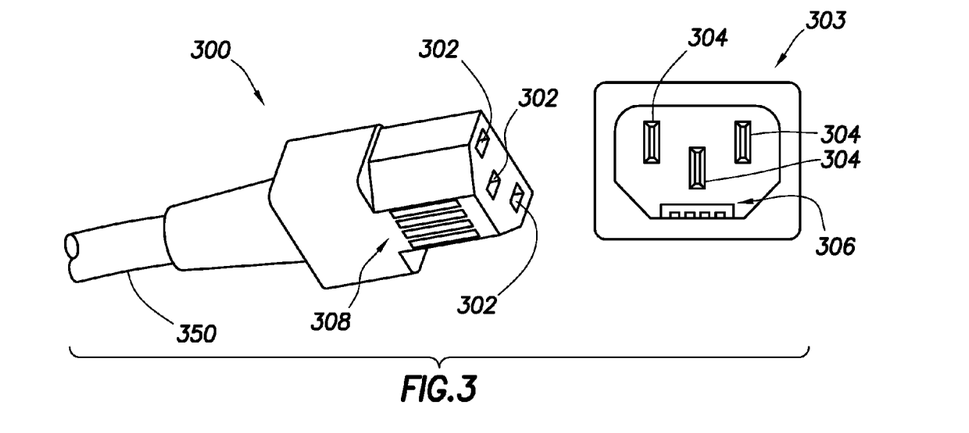
FIG. 3 shows a connector and cord end in accordance with at least some embodiments.

FIG. 3 illustrates a cord end 300 and corresponding socket 302. In some embodiments, the cord end 300 may be used on the power-supply end of a power cord. Likewise, the socket 302 may be used as the socket of a switching power supply for the rack-mounted computer system 102 and/or blade-enclosure 104. Cord end 300 defines a plurality of apertures 302 within which conductive materials are exposed, and the conductive materials are coupled to conductors in the cord 350. Relatedly, the socket 303 defines a plurality of blades 304 configured to fit within the apertures 302 when the cord end 300 is plugged into socket 303. The cord end 300 and socket 303 are based on IEC C13 line plug and C14 chassis sockets; however, other line plug and socket configurations may be equivalently used.

Still referring to FIG. 3, in addition to the power conductors to carry operational power, a socket 303 in accordance with at least some embodiments also comprises a plurality of data conductors 306. Likewise, the cord end 300 comprises a corresponding plurality of data conductors 308, and at least some of the data conductors couple to conductors in the cord 350. The data conductors 306 are disposed in the socket 302 in such a way that when the cord end 300 mates with a socket 303, the data conductors 308 on the cord end 300 electrically couple to the data conductors 306 in the socket 303. In accordance with at least some embodiments, the socket 303 comprises four data conductors; however, any number of data conductors may be equivalently used. Moreover, though termed "data conductor," the name shall not be read to require that each conductor carry data. For example, one of the conductors may be a ground conductor, and another used for a presence detect between coupled devices.

Figure 4:
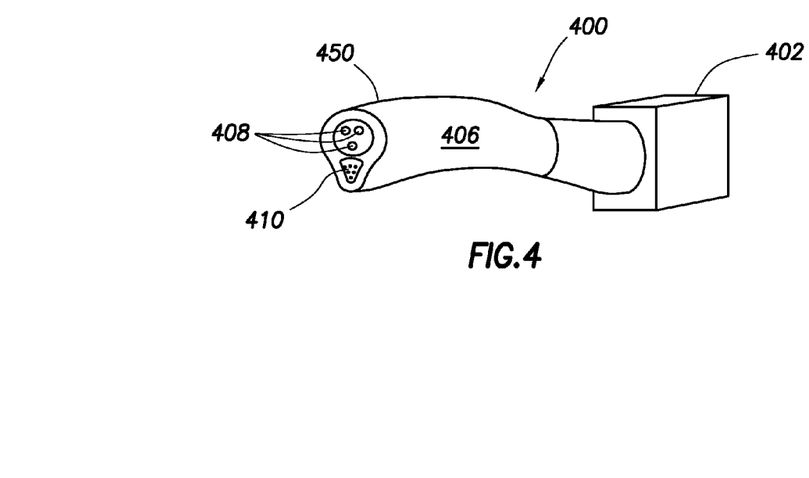
FIG. 4 shows a power cord in accordance with at least some embodiments.

In order to illustrate the integrated nature of the power conductors and data conductors in the power cords, FIG. 4 shows a perspective cut-away view of a power cord 400 in accordance with at least some embodiments. The power cord 400 could be the power cords 150, 152, 154 or 156 of FIG. 1, the cord 250 of FIG. 2, or the cord 350 of FIG. 3. In particular, the power cord 400 comprises a generically drawn cord-end 402, which in practice could be constructed similar to cord end 202 (FIG. 2), cord end 300 (FIG. 3), or any other suitable cord end with power conductors and data conductors. The cord end 402 couples to a cable 450 that comprises an outer jacket 406, and a plurality of conductors disposed within the outer jacket 406. In accordance with the various embodiments, the conductors within the outer jacket 406 comprise power conductors 408 configured to carry operational power for a computer system. Moreover, the plurality of conductors also comprises a plurality of data conductors 410, which in some embodiments are shielded to reduce noise induced by the power conductors 408.

Figure 5:
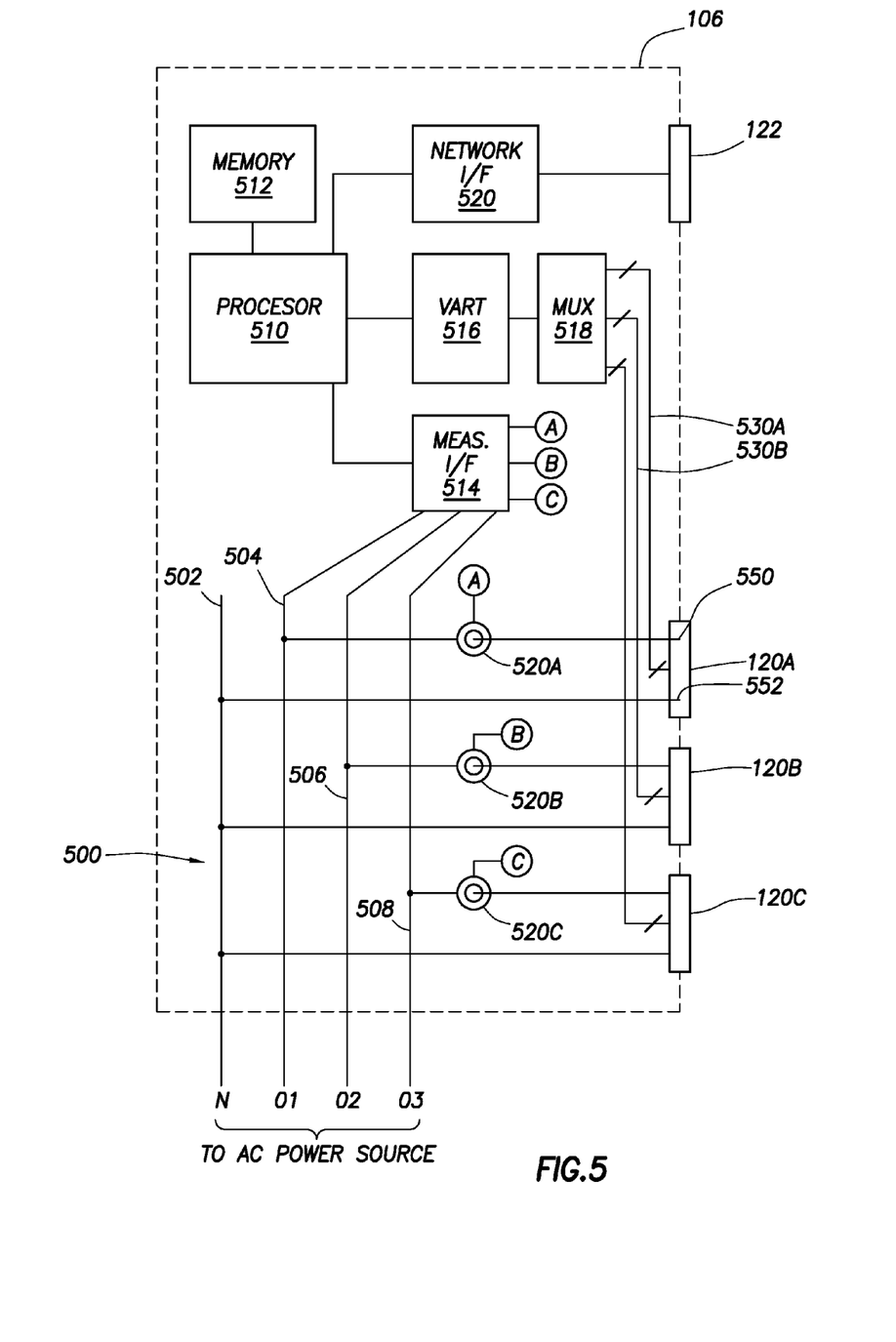
FIG. 5 shows an electrical block diagram of a power distribution unit in accordance with at least some embodiments.

FIG. 5 shows a block diagram of illustrative components of a power distribution unit in accordance with at least some embodiments. Though FIG. 5 discusses power distribution unit 106, the discussion is equally applicable to power distribution unit 108. In particular, illustrative power distribution unit 106 is configured to couple to a source of AC power. As illustrated, the source of AC power is a three-phase source in a "Y" configuration, but delta configurations may be equivalently used. Moreover, in some situations, a single phase AC power source may be used. The phases of the AC power couple to bus conductors 500 within the power distribution unit 106. In situations where significant power flows through the power distribution unit 106, the bus conductors may be bus bars. Further, FIG. 5 shows a plurality of power connectors 120. FIG. 5 illustrates only three electrical connectors, one for each phase of the AC power source, so as not to unduly complicate the figure; however, in other embodiments each phase of the AC power source may have many power connectors associated therewith. Each power connector 120 has conductors (e.g., conductors 550 and 552 of socket 120A) that couple to at least some of the bus conductors 500. For example, power connector 120A may couple to the neutral bus conductor 502 and the first phase leg 504. Likewise, power connector 120B may couple to the neutral conductor 502 and the second phase leg 506. Finally, power connector 120C may couple to the neutral conductor 502 and the third phase leg 508. In other embodiments where a delta configured AC source is used, the neutral conductor is omitted, and the electrical connectors connect to two of the three phases. Though not shown so as not to unduly complicate the figure, each electrical connector 120 likewise couples to a safety ground conductor.

Still referring to FIG. 5, the illustrative power distribution unit 106 further comprises a processor 510. The processor 510 may be any suitable processor, such as a processor from the "ARM9" family of processors available from ARM, Inc. of Sunnyvale, Calif. Processor 510 couples to memory 512, which may comprise read only memory (ROM) to store boot code, as well as software that when executed turns the processor 510 into a special-purpose processor (i.e., to run a power distribution unit). Further, memory 512 may comprise random access memory (RAM) to be the working memory for the processor 512. The processor 510 also couples to a measurement interface (I/F) device 514, universal asynchronous receiver/transmitter (UART) 516, multiplexer (MUX) 518, and a network interface 520. Each will be discussed in turn, starting with the UART 516 and multiplexer 518.

As mentioned above, each power distribution unit is configured to communicate with computer systems coupled to the power connectors, with the communication taking place over data conductors associated with each electrical connector and corresponding power cord. In order to facilitate the communication, and in accordance with at least some embodiments, the processor 510 couples to the data conductors of each power connector by way of the multiplexer 518 and UART 516. Consider, as an example, that processor 510 first communicates with a computer system coupled to and drawing operational power through the connector 120A. In this illustrative situation, multiplexer 518 is commanded to communicatively couple the UART 516 to the data conductors 530A associated with power connector 120A. With the multiplexer 518 so configured, the processor 510, by way of the UART 516, communicates with the computer coupled to the power connector 120A. The communications may be by way of any suitable protocol (e.g., RS232, RS485). Once the processor 510 has concluded the communication with a computer system coupled to power connector 120A, the multiplexer 518 may be commanded to communicatively couple the UART to the data conductors 530B associated with power connector 120B. Thereafter, the processor 510 communicates with the computer system coupled to power connector 120B. In other embodiments, a separate UART device may be present for each power connector 120, and thus the processor 510 may simultaneously communicate with multiple computer systems.

In addition to the ability to communicate with computer systems drawing operational power, power distribution units in accordance with the various embodiments also comprise a plurality of current measurement devices disposed within the interior volume defined by the enclosure. FIG. 5 illustrates the current measurement devices as current transformers 520. In other embodiments, different current sensing technology (e.g., Hall affect sensors, precision resistors) may be equivalently used. Each of the illustrative current transformers 520 couple to the measurement interface 514. The measurement interface 514 may read the electrical current actually drawn through each electrical connector 120 by way of the respective current transformer 520. Moreover, in some embodiments the measurement interface 514 is also coupled to the one or more phases of the AC power source. Thus, the measurement interface may be able to calculate the power drawn by each computer system through respective power connections 120. The processor 510 is communicatively coupled to the measurement interface 514, and thus in addition to communicating directly with computer systems drawing operational power through respective power connectors 120, the processor 510 is also able to obtain data regarding electrical current and/or electrical power drawn by each computer system. Further still, the processor 510 may be programmed to know which power connector 120 couples to which phase of the AC power source, and thus by mere communication with the computer system determine the phase through which the computer system draws operational power.

Still referring to FIG. 5, network interface 520 couples to a data connector 122 and the processor 510. In accordance with at least some embodiments, the network interface 520 enables the processor 510 to communicate on local area networks, wide area networks, and/or the Internet in general though data connector 122. The network interface 520 may implement, for example, Ethernet protocol communication.

Figure 6:
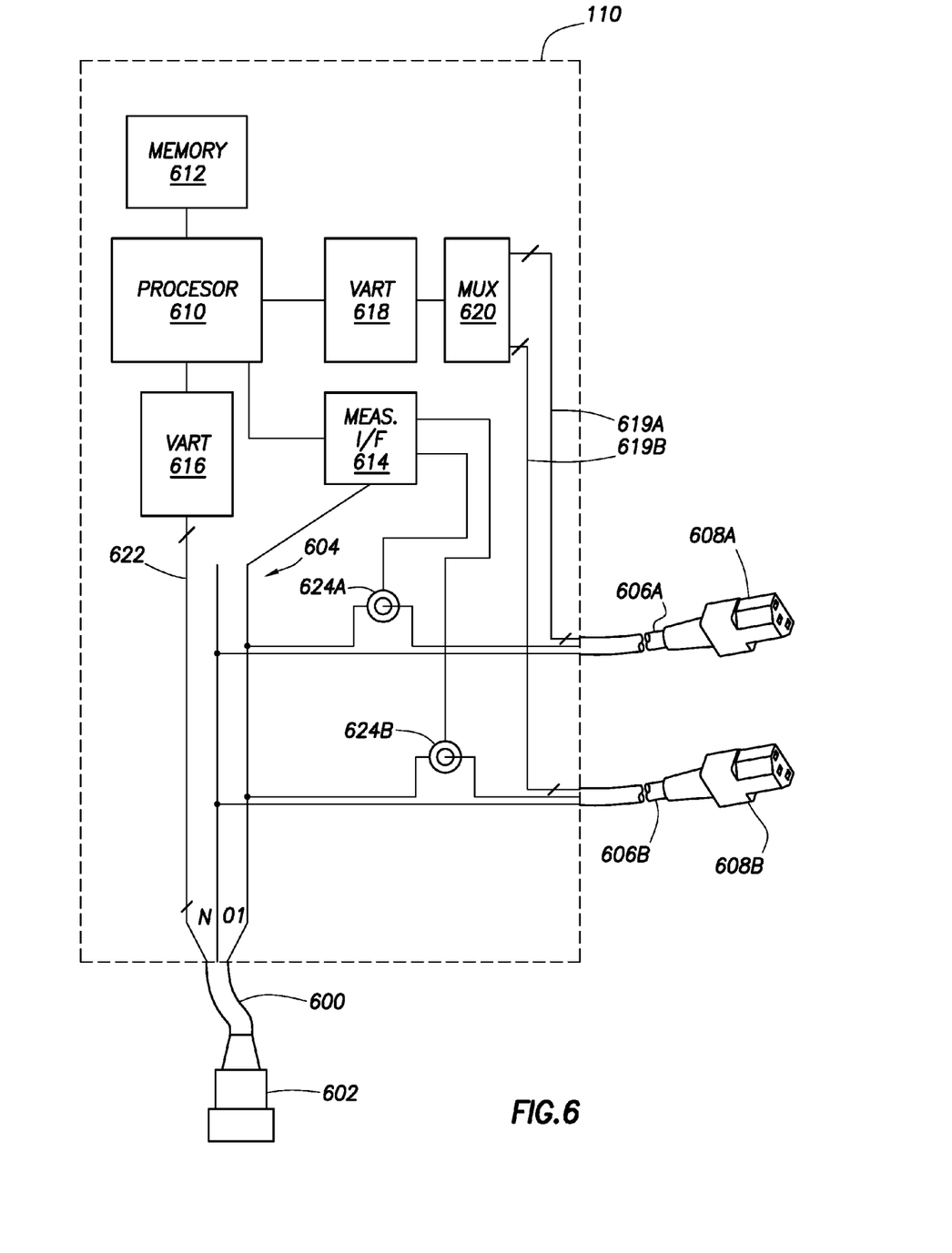
FIG. 6 shows an electrical block diagram of a extension bar in accordance with at least some embodiments.

While in some situations the computer systems may couple directly to the power distribution units 106, 108, as illustrated in FIG. 1 in some cases an extension bar 110, 112 may couple between a computer system and the power distribution units 106, 108. FIG. 6 illustrates an extension bar in accordance with at least some embodiments. Though FIG. 6 discusses extension bar 110, the discussion is equally applicable to extension bar 112. In particular, illustrative extension bar 110 is configured to couple to a power connector 120, 130 of a power distribution unit by way of a cord 600 and cord end 602, which in some embodiments is similar to the cord end 202 (FIG. 2). Because illustrative extension bar 110 receives power from a power connector of a power distribution unit, in some embodiments only single phase AC power is present within the extension bar. The AC power from the cord 600 couples to bus conductors 604 within the extension bar 110. Further, FIG. 6 illustrates a plurality of cords 606 extending from the extension bar 110, with each cord having a cord end 608. In some embodiments, the cord ends 608 are similar to the cord ends 302 (FIG. 3). FIG. 6 illustrates only two cords 606 so as not to unduly complicate the figure; however, in other embodiments a greater number of cords 606 may be present. While the cords 606 are shown hard-wired to the extension bar 110, in other embodiments the cords 606 may couple to the extension bars by socket and cord-end arrangement (e.g., C13/C14 connectors discussed above). Though not shown so as not to unduly complicate the figure, each cord 606 likewise couples to a safety ground conductor.

Still referring to FIG. 6, the illustrative extension bar 110 further comprises a processor 610. The processor 610 may be any suitable processor, such as a PIC processor/microcontroller available from Microchip, Inc. of Chandler, Ariz. Processor 610 couples to memory 612, which may comprise ROM to store boot code, as well as software that when executed turns the processor 610 into a special-purpose processor (i.e., to run an extension bar). Further, memory 612 may comprise RAM to be the working memory for the processor 610. The processor 610 also couples to a measurement interface device 614, UART 616, UART 618, and a multiplexer 620. Each will be discussed in turn, starting with the UART 616.

In order to facilitate the communication between the power distribution unit 106, 108 to which the extension bar 110 is coupled, and a computer system coupled to the extension bar 110 (by cords 606), the processor 610 couples to data conductors 622 in the cord 600 by way of the multiplexer 618. Data communications from the power distribution units 106, 108 to the extension bar 110 thus couple to the processor 610 through the data conductors 622 and UART 616. Likewise, data communications from the processor 610 to the power distribution units 106, 108 couple from the processor 610 to the data conductors 622 through the UART 616.

The processor 610 also couples to the data conductors of each cord 606 by way of the multiplexer 620 and UART 618. Consider, as an example, that processor 610 first communicates with a computer system coupled to cord 606A. In this illustrative situation, multiplexer 620 is commanded to communicatively couple the UART 618 to the data conductors 619A coupled to cord 606A. With the multiplexer 620 so configured, the processor 610, by way of the UART 618, communicates with the computer system coupled to cord 606A. The communications may be by way of any suitable protocol (e.g., RS232, RS485). Once the processor 610 has concluded the communication with a computer system coupled to cord 606A, the multiplexer 620 may be commanded to communicatively couple the UART 618 to the data conductors 619B coupled to cord 606B. Thereafter, the processor 610 communicates with the computer system coupled to cord 606B. In other embodiments, a separate UART device may be present for each cord 606, and thus the processor 610 may simultaneously communicate with multiple computer systems. In yet still other embodiments, a single UART device may be present in the extension bar 110, and the multiplexer 620 may also selectively coupled the single UART to the data conductors 622 from the cord 600 in addition to selectively coupling the UART to the data conductors 619 from the cords 606.

In addition to the ability to communicate with computer systems drawing operational power through the cord 606, and/or communicate with a power distribution unit 106, 108 through cord 600, extension bars in accordance with the various embodiments also comprise a plurality of current measurement devices. FIG. 6 illustrates the current measurement devices as current transformers 624. In other embodiments, other current sensing technology (e.g., Hall affect sensors, precision resistors) may be equivalently used. Each of the illustrative current transformers 624 couple to the measurement interface 614. The measurement interface 614 may read the electrical current actually drawn through each cord 606 by way of the respective current transformer 624. Moreover, in some embodiments the measurement interface 614 is also coupled to the supply or "hot" conductor, and thus the measurement interface 614 may be able to calculate the power drawn by each computer system through respective cord 606. The processor 610 is communicatively coupled to the measurement interface 614, and thus in addition to communicating directly with computer systems drawing operational power through respective cords 606, the processor is also able to obtain data regarding electrical current and/or electrical power drawn by each computer system.

Figure 7:
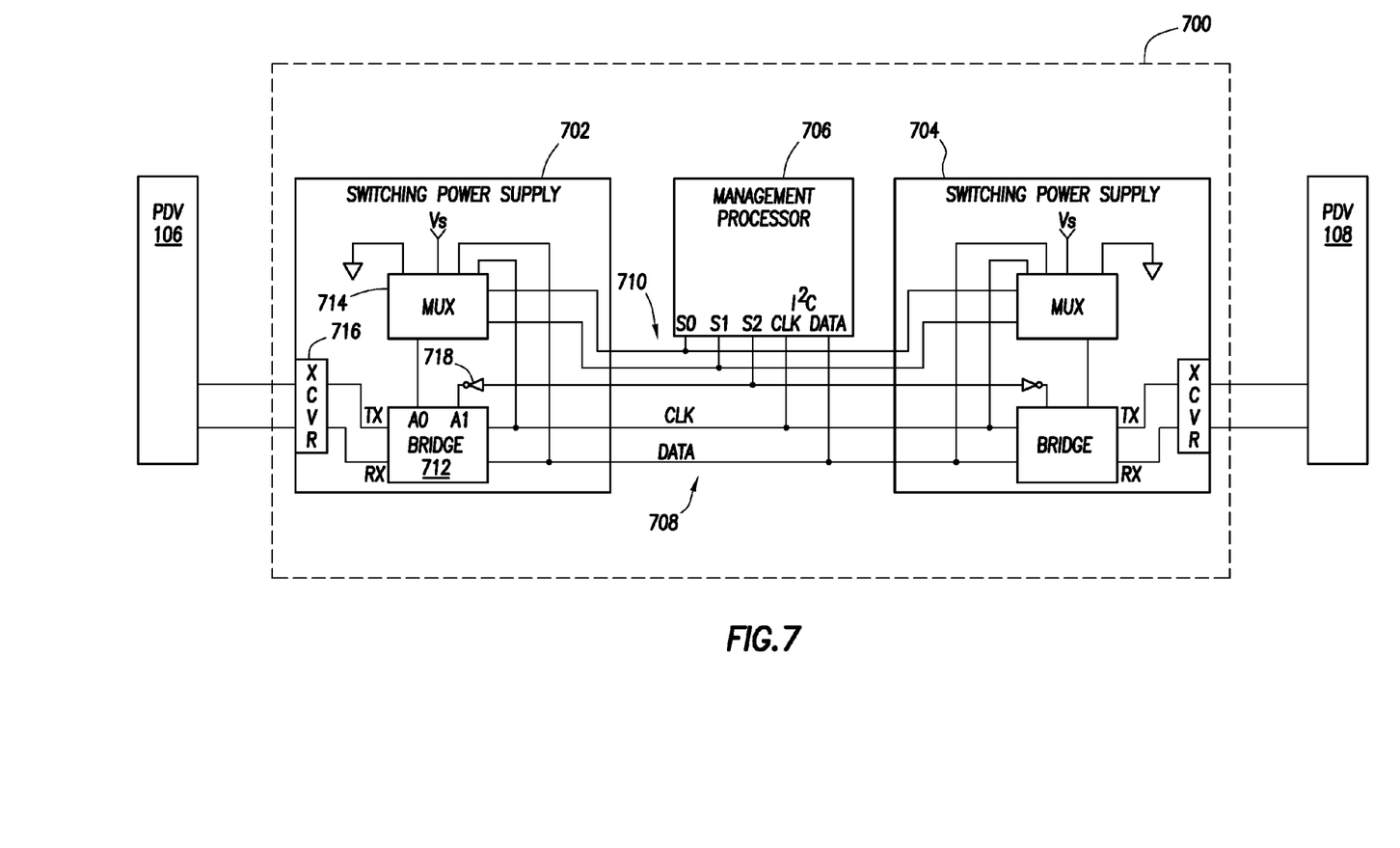
FIG. 7 shows an electrical block diagram of the data portions of power supplies in accordance with at least some embodiments.

FIG. 7 shows an electrical block diagram of various components involved in communication between a power distribution unit and/or an extension bar and a management processor of a computer system. In particular, FIG. 7 illustrates power distribution units 106 and 108, along with computer system 700. Computer system 700 is representative of either rack-mounted computer system 102 or blade enclosure 104. Illustrative computer system 700 comprises a switching power supply 702, switching power supply 704, and a management processor 706. In some embodiments, the management processor 706 is different than the main processor or processors of a computer system, but in other embodiments the data communications aspect of the switching power supplies may couple to the main processors. Moreover, while the power distribution units 106, 108 are illustrated, the discussion is equally applicable if the extension bars 110, 112 are coupled between the power distribution units 106, 108 and the switching power supplies. Only the data communication aspects of the switching power supplies 702 and 706 are illustrated so as not to unduly complicate the figure. Finally, while only two switching power supplies are illustrated, in some cases (e.g., blade enclosure 104) eight or more power supplies may be present.

The management processor 706 communicatively couples to the switching power supplies 702, 704 by way of a communication bus 708. In some cases the communication bus is a serial bus, such as the Inter-Integrated Communication (I2C) bus, but other serial busses may be equivalently used. Moreover, in other embodiments other bus types (e.g., parallel bus) may be used. The management processor 706 is a bus master on the illustrative I2C bus 708, and the management processor 706 indicates the target for communications based on a set of address lines 710 that couple to each switching power supply 702, 704. In particular, in order to communicate with a power supply, the management processor 706 drives the address of the particular power supply on the address lines 710 (S0, S1, S2), and drives the communication on the illustrative I2C bus 708. The addressed switching power supply responds appropriately (e.g., accepts a communication from the management processor, or sends a communication to the management processor). Switching power supplies not assigned the particular address ignore the communications.

Referring to switching power supply 702 as illustrative of both switching power supplies 702 and 704, the illustrative switching power supply 702 comprises a bridge 712, a multiplexer 714 and a transceiver (XCVR) 716. Transceiver 716 is a data follower circuit for impedance matching purposes, and thus may be omitted in some embodiments. Communication between the power distribution unit 106 (or the extension bar) and the switching power supply 702 is, in some embodiments, an RS232 compliant communication, while the communication between the switching power supply 702 and the management processor 706 is an I2C communication. Thus, bridge device 712 acts as a protocol translation device between the two protocols. In the illustrative case of RS232 to I2C translation, the bridge 712 device may be a part number SC161S740IPW bridge available from NXP Semiconductors of Eindhoven, The Netherlands. The illustrative bridge 712 has internal registers that buffer communications to and from the bridge 712. Moreover, the bridge 712 has address lines A1 and A0 which the bridge uses as an indication of whether communications on the illustrative I2C bus are directed to bridge 712.

In some embodiments, eight switching power supplies may be present in a computer system 700; however, the bridge 712 has only two address lines (i.e., A1 and A0). In order for the management processor 706 to uniquely address each bridge 712 for communication, the illustrative switching power supply 702 comprises a multiplexer 714, and relies on a feature of the bridge 712. In particular, the illustrative bridge 712 can distinguish not only Boolean values on the address lines A1, A0, but also I2C data as logical state, and a clock signal as a logical state. In other words, a single address line (e.g., A0) may discern at least four distinct quasi-Boolean states (i.e., logic high voltage as first state, logic low voltage as a second state, the presence of a clock signal as a third state, and the presence of changing data signal as a fourth state). The I2C clock or data applied to the address lines does not become the signals on which the bridge 712 performs the translations; rather, the signals on the address lines are merely used for addressing purposes, and the separately connected I2C bus and data lines are used in the translation process. Thus, the multiplexer has coupled on its inputs a ground or common, a logic high voltage, the I2C, and the I2C data signal. The lower order address bits from address bus of the management processor 706 are tied to the control bits of the multiplexer, and thus a translation occurs between the truly Boolean address states driven on the address bus, and the quasi-Boolean signals applied to the bridge address inputs. Other addressing schemes may be equivalently used.

Communications with the bridge 712, both on the power distribution unit 106 side, and the management processor 706 side, are "mail box" type communications. Consider first the power distribution unit 106 side of the communications. The illustrative power distribution unit 106 has a UART 516 coupled through a multiplexer 518 such that the processor 510 communications over the data conductors of a single power connector 120 at any one time. At times when the bridge 712 has data to send to the power distribution unit 106, the power distribution unit 106 may be busy communicating to other devices. Thus, the bridge 712 has registers that buffer (hold in a "mail box") communications. When the power distribution unit 106 is ready to send or receive data, the bridge 712 is notified by predetermined message passing between the devices. Likewise on the illustrative I2C side, the illustrative management processor 706 communicates over the I2C bus 708 with a single bridge device 712 at any one time, and eight such bridge devices (in eight separate switching power supplies) may be present. Thus, at times when the bridge 712 has data to send to the management processor 706, the management processor 706 may be busy communicating to other bridge devices. Thus, the registers of the bridge 712 also act to buffer (hold in a "mail box") communications directed to the management processor 706. When the management processor is ready to send or receive data, the address of the particular bridge 712 is driven on the address lines 710 (and translated by the multiplexer).

As mentioned above, one purpose of the communications between the power distribution units 106, 108 and the computer systems 102, 104 (particularly the management processors therein), is to determine or establish the power topology data. Although portions of the communications to determine the power topology data have been described in relation to the hardware descriptions above, the specification now turns to determining the power topology data in accordance with the various embodiments. Referring again to FIG. 1, in accordance with the various embodiments each power distribution unit 106, 108 is configured to communicate with computer systems coupled to and drawing power from the respective power distribution unit 106, 108. Merely by way of communicating with a coupled computer system, a power distribution unit gathers power topology data (in this illustrative case, the fact that a computer system is coupled to the particular power distribution unit).

However, in some embodiments further power topology data is gathered by the power distribution units 106, 108. For example, in communicating with an attached computer system 102, 104, the processor 510 of the power distribution unit may request that the attached computer system 102, 104 provide a globally unique identification number of the computer system. The identification number may be created in any suitable manner, such as by concatenating some or all of the computer system's serial number and some or all of the computer system's model number. Thus, in communicating with a computer system 102, 104 the power distribution unit 106, 108 not only determines that the computer system is coupled to a power distribution unit, but also the identification of the computer system. In the illustrative case of FIG. 1, the power distribution unit 106 may receive the identification number of computer system 102, and likewise the power distribution unit 108 may receive the identification number of the computer system 102.

In addition to determining power topology data by communicating with particular computer systems, the power distribution units 106, 108 may also determining power topology data in the form of a value indicative of electrical current drawn by each coupled computer system, and/or a value indicative of the power drawn by each coupled computer system. In cases where the computer system is directly coupled to the power distribution unit 106, 108 (e.g., the blade enclosure 104 in illustrative FIG. 1), the power distribution units may determine the illustrative information by referring to values determined by the internal current measurement devices. In cases where the computer system is coupled to the power distribution unit 106, 108 through the extension bar 110, 112, the power topology data in the form of electrical current drawn and/or power drawn may be determined by the extension bar 110, 112, and communicated to the power distribution unit 106, 108.

Further still, the power distribution unit 106, 108 may determine power topology data in the form of data indicative of from which phase of a multi-phase power source a particular computer system 102, 104 draws operational power. The power distribution unit 106, 108 may determine the data indicative of phase based on an indication of the power connector to which the computer system couples and a knowledge (which may be pre-programmed) of the relationship between the power connectors and the phases of the multi-phase source.

Standing alone, a power distribution unit 106, 108 can only determine a portion of the power topology of an overall system. For example, power distribution unit 106 may not know that computer system 102 is also coupled to the power distribution unit 108. As shown in FIG. 1, each power distribution unit may couple to the management computer system 114. In accordance with at least some embodiments, each power distribution unit 106, 108 sends the power topology data to the management computer system 114. The management computer system 114, using information from the multiple power distribution units, may thus determine an overall power topology for the system. In some cases, the management computer may display the power topology data itself, or a graphical representation of the power topology data.

Further still, in some embodiments the management computer system 114, after receiving the power topology data from the power distribution units, may determine that one or more computer system systems are drawing too much operational power, and that power usage should be curtailed. In such embodiments, the management computer system 114 may send message to the computer systems 102, 104 requiring the computer systems to reduce power usage (e.g., reducing core processor clock frequency, or perhaps perform an orderly shut down) to avoid any one circuit breaker tripping, or overloading a phase a multi-phase source. The communications between the management computer system 114 and computer systems 102 and 104 are not limited to commands related to power consumption, as any communication is possible (e.g., sending an identification of a management station, or sending an encryption key).

Figure 8:
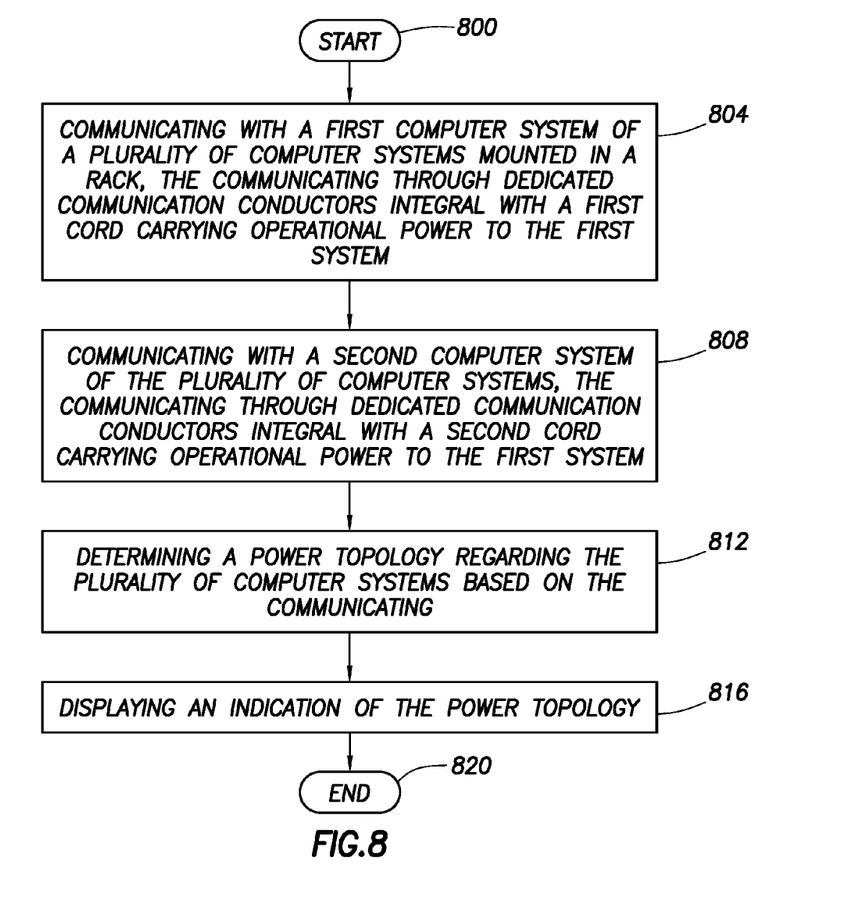
FIG. 8 shows a method in accordance with at least some embodiments.

FIG. 8 shows a method in accordance with at least some embodiments. In particular, the method starts (block 800) and proceeds to communicating with a first computer system of a plurality of computer systems mounted in a rack, the communicating through dedicated communication conductors integral with a first cord carrying operational power to first computer system (block 804). The illustrative method then comprises communicating with a second computer system of the plurality of computer systems, the communicating through dedicated communication conductors integral with a second cord carrying operational power to first computer system (block 808). Thereafter, the illustrative method involves determining a power topology regarding the plurality of computer systems based on the communicating (block 812), displaying an indication of the power topology (block 816), and the illustrative method ends (block 820).

The above discussion is meant to be illustrative of the principles and various embodiments of the present invention. Numerous variations and modifications will become apparent to those skilled in the art once the above disclosure is fully appreciated. For example, the management computer 114 need not be a system external to the rack comprising computer systems 102 and 104; rather, the management computer system 114 may itself be coupled to and drawing operational power from the power distribution units 106 and 108. Further, while each power distribution unit 106, 108 is shown coupled directly to the management computer system 114, in other embodiments intermediate devices may reside in the data communication pathway between the power distribution units and the management computer system 114. For example, the power distribution units may be daisy chained together by way of their respective data connectors, and only a single power distribution unit coupled to the management processor. Moreover, the computer systems for which the power topology is discovered may be any device with an internal processor or management processor, such as storage devices and network communication devices. It is intended that the following claims be interpreted to embrace all such variations and modifications.

What is claimed is:

1. A method comprising:
communicating, by a first power distribution unit, with a first computer system of a plurality of computer systems mounted in a rack, the communicating through dedicated communication conductors integral with a first cord carrying operational power to first computer system;
communicating, by a second power distribution unit, with a second computer system of the plurality of computer systems, the communicating through dedicated communication conductors integral with a second cord carrying operational power to first computer system;
determining, by the first and second power distribution units, a power topology regarding the plurality of computer systems based on the communicating, wherein determining the power topology comprises determining from which phase of a multi-phase power source each of the first and second computer systems draw operational power; and
communicating an indication of the power topology.

2. The method of claim 1 wherein determining the power topology further comprises identifying at least one intermediate device through which each of the first and second computer systems draw operational power.

3. The method of claim 1 wherein communicating with the first and second computer systems further comprises obtaining an identification value from each of the first and second computer systems.

4. The method of claim 3 wherein determining further comprises determining the identification value and an indication of the electrical connector to which the first and second cords respective couple.

5. The method of claim 3 further comprising:
sending a message through the communication conductors to the first computer system, the message directing a change in power consumption by the first computer system; and
changing power consumption by the first computer system responsive to the message.

6. A system comprising:
a first power distribution unit coupled to a source of alternating current power, the first power distribution unit defines a first plurality of electrical connectors, each electrical connector defines conductors configured to carry power and conductors configured to carry data;
a second power distribution unit, different than the first power distribution unit, the second power distribution unit coupled to a source of alternating current power, the second power distribution unit defines a second plurality of electrical connectors different than the first plurality of electrical connectors, each electrical connector defines conductors configured to carry power and conductors configured to carry data;
a first computer system communicatively coupled to the first and second power distribution units;

a second computer system coupled to an electrical connector of the first plurality of electrical connectors; and a third computer system coupled to an electrical connector of the second plurality of electrical connectors;

the first power distribution unit is configured to communicate with the second computer system by way of the conductors configured to carry data of the electrical connector of the first plurality of electrical connectors, and the second power distribution unit is configured to communicate with the third computer system by way of the conductors configured to carry data of the electrical connector of the second plurality of electrical connectors; and the first and second power distribution units are configured to send power topology data to the first computer system, the power topology data associated with the communication to the respective first and second computer systems; and wherein the first computer system is configured to determine, based on the communications, the power distribution unit from which each of the second and third computer systems draw power.

7. The system of claim 6 wherein the first computer system is configured to determine, based on the communication, from which phase of the alternating current power source each of the second and third computer systems draw power.

8. The system of claim 6 wherein the first computer system is configured to send power consumption commands to the second and third computer systems through the respective conductors configured to carry data, and where the second and third computer systems are configured to modify power consumption consistent with the commands.

9. The system of claim 6 wherein the first power distribution unit further comprises:

a plurality of current measurement devices associated one each with each electrical connector of the first plurality of electrical connectors; and a processor coupled to the plurality of current measurement devices and the conductors configured to carry data of the first power distribution unit;

the processor is configured to send, to the first computer system, data representative of electrical current flow measured by at least some of the plurality of current measurement devices.

10. The system of claim 6 further comprising:

the second computer system further comprises:

a management processor;

a first power supply coupled to the electrical connector of the first power distribution unit;

a second power supply coupled to an electrical connector of the second power distribution unit;

the first power supply is configured to transfer messages from the first computer system to the management processor, and the second power supply is configured to transfer messages from the first computer system to the management processor.

11. An apparatus comprising:

an enclosure that defines an external surface and an interior volume;

a power supply;

a plurality of electrical connectors accessible on the external surface, each electrical connector defines power conductors configured to carry operational power and data conductors configured to carry data;

a plurality of current measurement devices disposed in the interior volume, one current measurement device in operational relationship with each electrical connector and configured to measure current drawn on at least one power conductor of the respective electrical connector; and a processor disposed within the interior volume, the processor coupled to the data conductors of the electrical connectors, and the processor coupled the plurality of current measurement devices;

the processor is configured to communicate with computer systems drawing operational power through the electrical connectors, the communication over respective data conductors of the electrical connectors; and the processor is configured to send power topology data to the processor outside the enclosure, the power topology data comprising a value indicative of electrical current drawn through at least one electrical connector, and the power topology data also specifying which phase of a multi-phase power source the power supply receives power.

12. The apparatus of any of claim 11 wherein the processor is configured to send the power topology data to the processor external to the enclosure by way of data conductors of an electrical connector.

13. The apparatus of claim 11 further comprising:

a data connector accessible on the external surface, the data connector defines data conductors to carry data, and the data connector different than the electrical connectors;

the processor configured to send the power topology data to the processor external to the enclosure by way of the data conductors of the data connector.

* * * * *

UNITED STATES PATENT AND TRADEMARK OFFICE
CERTIFICATE OF CORRECTION

PATENT NO. : 8,732,508 B2
APPLICATION NO. : 13/254144
DATED : May 20, 2014
INVENTOR(S) : Charles W. Cochran et al.

It is certified that error appears in the above-identified patent and that said Letters Patent is hereby corrected as shown below:

In the Claims

In column 14, line 25, in Claim 11, delete "coupled" and insert -- coupled to --, therefor.

In column 14, line 38, in Claim 12, delete "of any of" and insert -- of --, therefor.

Signed and Sealed this
Twenty-first Day of October, 2014

Michelle K. Lee
*Deputy Director of the United States Patent and Trademark Office*